(12) United States Patent
Rui et al.

(10) Patent No.: US 10,579,690 B2
(45) Date of Patent: Mar. 3, 2020

(54) MULTIMEDIA INFORMATION POP-UP WINDOW PROCESSING METHOD AND DEVICE, AND COMPUTER STORAGE MEDIUM

(71) Applicant: Tencent Technology (Shenzhen) Company Limited, Shenzhen (CN)

(72) Inventors: Zhou Rui, Shenzhen (CN); Guo Xi, Shenzhen (CN); Jin Cai, Shenzhen (CN); Zhao Rui Hua, Shenzhen (CN); Wang Qiu Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 271 days.

(21) Appl. No.: 15/686,708

(22) Filed: Aug. 25, 2017

(65) Prior Publication Data

US 2017/0351775 A1    Dec. 7, 2017

Related U.S. Application Data

(63) Continuation of application No. PCT/CN2016/079940, filed on Apr. 21, 2016.

(30) Foreign Application Priority Data

Jul. 15, 2015   (CN) .......................... 2015 1 0415142

(51) Int. Cl.
*G06F 16/9535*   (2019.01)
*G06F 9/451*   (2018.01)
(Continued)

(52) U.S. Cl.
CPC ........ *G06F 16/9535* (2019.01); *G06F 3/0481* (2013.01); *G06F 9/451* (2018.02); *G06F 16/957* (2019.01); *G06Q 30/0277* (2013.01)

(58) Field of Classification Search
CPC .. G06F 16/957; G06F 16/9535; G06F 3/0481; G06F 9/451; G06Q 30/0277
See application file for complete search history.

(56) References Cited

U.S. PATENT DOCUMENTS 6,463,430 B1 * 10/2002 Brady ................... G06F 16/353
7,051,285 B1 *  5/2006 Harrison ............... G06F 3/0481
                                                      715/760

(Continued)

FOREIGN PATENT DOCUMENTS

CN   104036030 A    9/2014
CN   104123276 A   10/2014
(Continued)

OTHER PUBLICATIONS

Zhao, Hang, "Research on Algorithm for Confidence Evaluation of SVM", Electronic Technology & Information Science, China Master's Theses Full-Text Database, No. 03, ISSN:1674-0246, dated Mar. 15, 2011, 51 pages.

(Continued)

*Primary Examiner* — Marc S Somers
(74) *Attorney, Agent, or Firm* — Brinks Gilson & Lione

(57) ABSTRACT

The present disclosure discloses a multimedia information pop-up window processing method and a computer storage medium. The method includes: detecting a multimedia information pop-up window event; extracting feature information of the multimedia information pop-up window event, and encapsulating the feature information of the multimedia information pop-up window event into a first request message; sending the first request message, to obtain the type of the multimedia information; and receiving a first request response message, obtaining the type of the multimedia information by parsing the first request response message, and processing the multimedia information pop-up window according to the type of the multimedia information. The (Continued)

present disclosure further discloses another multimedia information pop-up window processing method, a terminal, and a server.

15 Claims, 12 Drawing Sheets

(51) Int. Cl.
*G06F 16/957* (2019.01)
*G06F 3/0481* (2013.01)
*G06Q 30/02* (2012.01)

(56) References Cited

U.S. PATENT DOCUMENTS

| | | | |
|---|---|---|---|
| 9,171,207 B1* | 10/2015 | Olcott | G06K 9/00442 |
| 2003/0233482 A1* | 12/2003 | Skrepetos | G06F 16/957 |
| | | | 709/250 |
| 2008/0172382 A1* | 7/2008 | Prettejohn | H04L 63/126 |
| 2008/0292136 A1* | 11/2008 | Ramani | G06T 1/0028 |
| | | | 382/100 |
| 2010/0125491 A1* | 5/2010 | Elliott | G06Q 30/02 |
| | | | 705/14.4 |
| 2010/0312548 A1* | 12/2010 | Herley | G06F 16/9032 |
| | | | 704/9 |
| 2015/0339829 A1* | 11/2015 | Smarda | G06F 16/583 |
| | | | 382/250 |

FOREIGN PATENT DOCUMENTS

| | | |
|---|---|---|
| CN | 104133894 A | 11/2014 |
| CN | 104462583 A | 3/2015 |
| CN | 104463642 A | 3/2015 |
| CN | 104618808 A | 5/2015 |
| WO | WO 2009039311 A2 | 3/2009 |

OTHER PUBLICATIONS

International Search Report and Written Opinion dated Jul. 21, 2016 for PCT Application No. PCT/CN2016/079940, 21 pages.
Office Action dated May 29, 2019 for Chinese Application No. 201510415142.9 with concise English Translation, 10 pages.

* cited by examiner

MULTIMEDIA INFORMATION POP-UP WINDOW PROCESSING METHOD AND DEVICE, AND COMPUTER STORAGE MEDIUM

CROSS-REFERENCE TO RELATED APPLICATION(S)

This application is a continuation of Patent Cooperation Treaty Patent Application No. PCT/CN2016/079940, filed on Apr. 21, 2016, which claims priority to Chinese Patent Application No. 201510415142.9, filed on Jul. 15, 2015, the entirety of which are all hereby incorporated by reference herein.

FIELD OF THE TECHNOLOGY

The present disclosure relates to multimedia information technologies, and in particular, to methods and computing devices for controlling display of a multimedia information pop-up window, and a computer storage medium for storing instructions that, when executed by a processor, execute the features described herein.

BACKGROUND OF THE DISCLOSURE

In the existing technology, a multimedia information pop-up window blocker mainly blocks a pop-up window event in two modes: general blocking and power blocking. The power blocking is an automatic blocking function, and the general blocking is a blocking function needing manual determining of a user. However, regardless of which blocking function is used, a user needs to preset blocking software, and then performs a corresponding blocking operation.

In the existing technology, when the multimedia information pop-up window blocker blocks a pop-up window, the following problems may occur: (1) It is recognized, in a manner of selecting a point on a screen, whether an advertisement window exists in a specified area. If being covered by another window, the advertisement window cannot be correctly recognized. (2) When a pop-up window recognition function of an advertisement window is initiated in a real-time detection mechanism, a time difference between the time the advertisement window pops up and the time it takes for the pop-up window recognition function to detect the advertisement window pop ups may result in the advertisement window flashing across the display screen, for at least a moment. (3) Advertisement window location areas are preferentially set ahead of time as a priority. For example, a middle of a screen and a lower right corner of the screen may be set as preferential advertisement window locations ahead of time. However, then only advertisement windows in the specified areas of the screen can be blocked, causing poor expansibility. (4) Only a preset advertisement type can be blocked, and an unknown advertisement window or a deformed window cannot be blocked.

SUMMARY

In view of this, the embodiments described herein provide a multimedia information pop-up window processing method and device, and a computer storage medium.

The technical solutions of the embodiments are implemented in this way:

An embodiment provides a multimedia information pop-up window processing method, the method being applied to a terminal, and the method including: detecting a multimedia information pop-up window event; extracting feature information of the multimedia information pop-up window event, and encapsulating the feature information of the multimedia information pop-up window event into a first request message; sending the first request message, to obtain the type of the multimedia information; and receiving a first request response message, obtaining the type of the multimedia information by parsing the first request response message, and processing the multimedia information pop-up window according to the type of the multimedia information.

Another embodiment further provides a terminal, including: a display and a processor, the display being configured to display information on a user interface; the processor being configured to perform the following operations by means of executable instructions: detecting a multimedia information pop-up window event; extracting feature information of the multimedia information pop-up window event, and encapsulating the feature information of the multimedia information pop-up window event into a first request message; sending the first request message, to obtain the type of the multimedia information; receiving a first request response message; and obtaining the type of the multimedia information by parsing the first request response message, and processing the multimedia information pop-up window according to the type of the multimedia information.

Another embodiment further provides another multimedia information pop-up window processing method, the method being applied to a server, and the method including: receiving a first request message, and obtaining feature information of a multimedia information pop-up window event by parsing the first request message; and matching the feature information of the pop-up window event with data stored in a first database by determining whether the feature information of the pop-up window event corresponds to the data stored in the first database, and recognizing and sending the type of the multimedia information according to a matching result.

Another embodiment further provides a server. The server includes a processor, configured to perform the following operations by means of executable instructions: receiving a first request message, and obtaining feature information of a multimedia information pop-up window event by parsing the first request message; and matching the feature information of the pop-up window event with data stored in a first database by determining whether the feature information of the pop-up window event corresponds to the data stored in the first database, and recognizing and sending the type of the multimedia information according to a matching result.

Another embodiment provides a computer storage medium. The computer storage medium stores a computer program. The computer program is used for performing the foregoing multimedia information pop-up window processing method.

DETAILED DESCRIPTION

By the multimedia information pop-up window processing method provided in the embodiments described herein, on the terminal side, a multimedia information pop-up window event is detected in any area of a display screen in real time; feature information of the multimedia information pop-up window event that includes a screenshot Hash value is extracted; the feature information of the multimedia information pop-up window event is encapsulated into a first request message; the first request message is sent, to request to obtain the type of the multimedia information; a first request response message is received, the type of the multimedia information is obtained by parsing the first request response message, and the multimedia information pop-up window is processed according to the type of the multimedia information. On the server side, the type of multimedia information is recognized to be an advertisement, a non-advertisement, or unknown according to feature information of a multimedia information pop-up window event, an existing advertisement feature database, and a non-advertisement feature database; when the type the multimedia information is recognized to be unknown, a window of the unknown multimedia information is clustered by using an image fuzziness recognition algorithm, and the clustered window is further recognized to be an advertisement or a non-advertisement. In this way, not only a preset advertisement window is blocked, but also an unknown window or a deformed window is blocked.

The technical solutions of the present disclosure are further described below in detail with reference to the accompanying drawings and specific embodiments.

Figure 1:
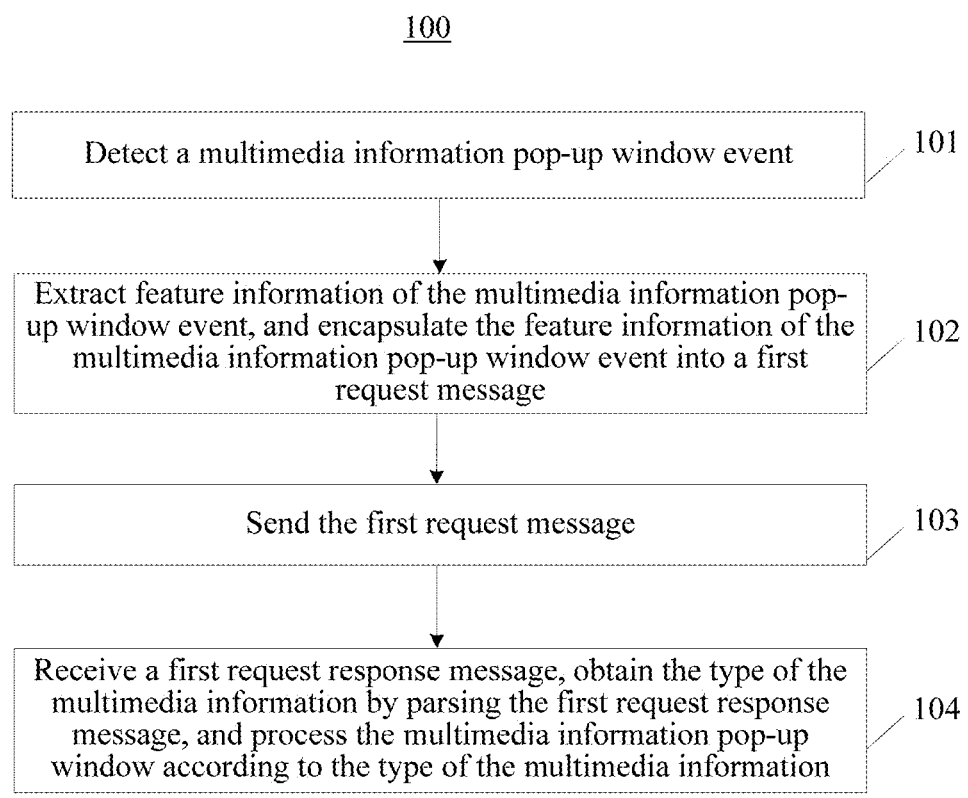
FIG. 1 is a schematic diagram of a detailed processing procedure of a multimedia pop-up window processing method according to Embodiment 1.

An embodiment of the present disclosure provides a multimedia pop-up window processing method. The method is applied to a terminal computing device. A detailed processing procedure of the multimedia pop-up window processing method according to Embodiment 1 is shown by flowchart 100 in FIG. 1, including the following steps:

Step 101: Detecting a multimedia information pop-up window event.

Specifically, a detection unit in the terminal detects, by using a SetEventHook mechanism of a Windows operating system, the multimedia information pop-up window event occurring at the terminal.

The multimedia information pop-up window event herein includes: a web page advertisement pop-up window and a software advertisement pop-up window.

Step 102: Extracting feature information of the multimedia information pop-up window event, and encapsulate the feature information of the multimedia information pop-up window event into a first request message.

Specifically, an extraction unit in the terminal extracts the feature information of the multimedia information pop-up window event before the multimedia information pop-up window is displayed.

The feature information of the multimedia information pop-up window event includes any one of or a combination of multiple of the following information: the window location, the window size, the window title, the progress, a screenshot hash (Hash) value, and the like.

The screenshot Hash value herein is obtained by calculating a two-dimensional histogram matrix of a screenshot of the multimedia information pop-up window event according to a red green blue (Red Green Blue, RGB) value of each pixel in the screenshot of the multimedia information pop-up window event; cutting the two-dimensional histogram matrix into 8*8 sub-matrices according to the size of the two-dimensional histogram matrix; performing hash operation on the 8*8 sub-matrices, to generate binary Hash values, the binary Hash values being 0 or 1; and forming a 64-bit long shaped value, that is, a screenshot feature code or a screenshot Hash value by using the binary Hash values. Each bit in the 64-bit screenshot feature code indicates a feature value of a sub-area. The terminal extracts feature codes of already known advertisement window screenshots on the cloud, to form an original advertisement sample library, that is, an advertisement feature database.

Step 103: Sending the first request message to a server.

Specifically, a first sending unit in the terminal sends the first request message to a server by means of a C/S protocol, to request to obtain the type of the multimedia information.

Step 104: Receiving a first request response message, obtaining the type of the multimedia information by parsing the first request response message, and processing the multimedia information pop-up window according to the type of the multimedia information.

Specifically, a receiving unit in the terminal receives the first request response message sent by the server. When the type of the multimedia information obtained by parsing the first request response message is a first multimedia information, a processing unit in the terminal blocks the multimedia information pop-up window event according to a preset processing policy. The blocking function that blocks the multimedia information pop-up window event includes, but is not limited to, closing the window, ending the progress, or the like.

Figure 2:
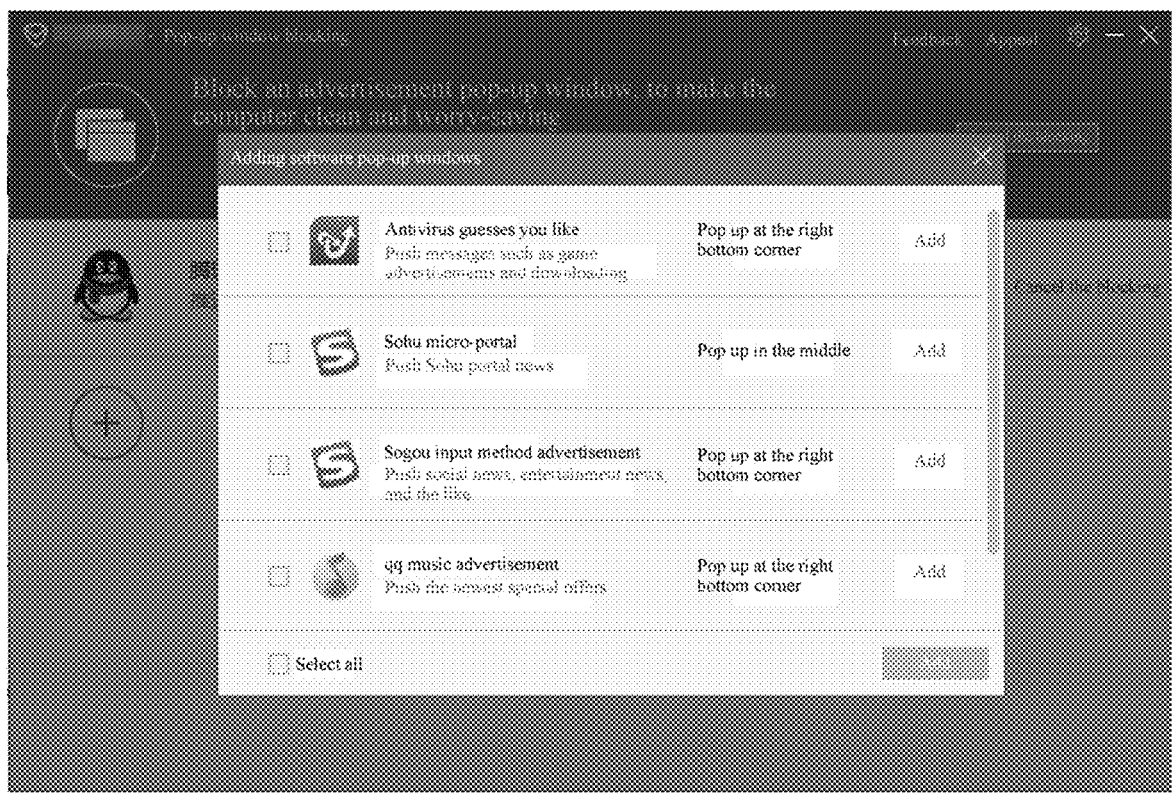
FIG. 2 is a schematic diagram of adding an advertisement blocking item according to this embodiment.

When the type of the multimedia information obtained by means of parsing is the first multimedia information (e.g., an advertisement), the terminal may actively add blocking of a software advertisement pop-up window as an operational function, thereby improving the degree of freedom and convenience of a user using the terminal. Specifically, a schematic diagram of a graphical user interface (GUI) 200 for adding ad advertisement blocking item is shown in FIG. 2. Checking the name of a corresponding software advertisement pop-up window indicates blocking the software advertisement pop-up window.

When the type of the multimedia information obtained by parsing the first request response message is a second multimedia information, the processing unit in the terminal sends the feature information of the pop-up window event to the server, to further determine the type of the multimedia information.

Whereas the first multimedia information is an advertisement, the second multimedia information may describe unknown information, that is, the second multimedia information relates to a type of multimedia information that cannot be recognized according to a current recognition policy implemented by either one or more of the terminal or server.

The blocking function that blocks the multimedia information pop-up window event according to a preset policy herein includes: prompting that the multimedia information pop-up window event is successfully blocked when reducing a window of the multimedia information pop-up window event at a first location until the window of the multimedia information pop-up window event disappears.

Figure 3:
FIG. 3 is a schematic diagram of displaying of blocking the multimedia information pop-up window event for the first time according to this embodiment.

In this embodiment, a schematic diagram of a GUI 300 that shows a blocking function that blocks the multimedia information pop-up window event for the first time is shown in FIG. 3. The residence time of a pop-up advertisement displayed on a display screen at the terminal is approximately is to 1.5 s. Computer Manager tips (tips) slide out from the lower right corner of the terminal screen after the advertisement resides on the screen for 1.5 s, to reduce the display of the pop-up advertisement at the lower right corner of the terminal screen, and hide the pop-up advertisement in a Manager shield. When the pop-up advertisement gradually disappears from the Manager shield, this indicates that the blocking succeeds. The tips feed back a blocking success result and display a check mark symbol indicating the blocking success. In this case, the advertisement blocking ends. Except for the blocking the multimedia information pop-up window event for the first time that needs to notify or prompt a user, the subsequent operation of blocking the multimedia information pop-up window event is performed by default, so as not to disturb the user.

Figure 4:
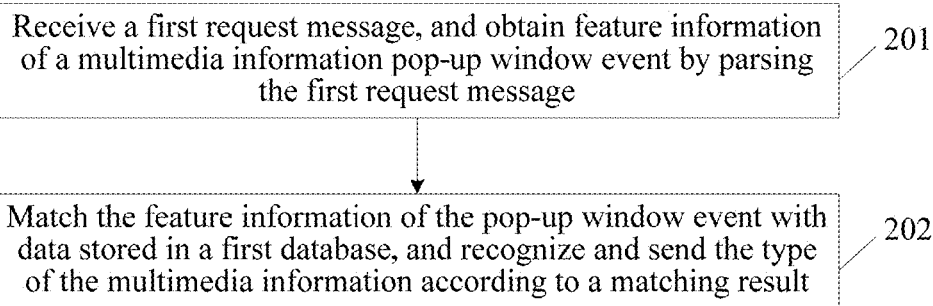
FIG. 4 is a schematic diagram of a detailed processing procedure of a multimedia pop-up window processing method according to Embodiment 2.

An embodiment of the present disclosure provides a multimedia pop-up window processing method as implemented by a server receiving the first request message and other information from the terminal. A detailed processing procedure of the multimedia pop-up window processing method according to Embodiment 2 is shown by flowchart 400 in FIG. 4, including the following steps:

Step 201: Receiving a first request message from the terminal, and obtaining feature information of a multimedia information pop-up window event by parsing the first request message.

Specifically, the server receives the first request message sent by a terminal, and obtains the feature information of the multimedia information pop-up window event by parsing the first request message.

The feature information of the multimedia information pop-up window event includes any one of or a combination of multiple of the following information: the window location, the window size, the window title, the progress, a screenshot Hash value, and the like.

The screenshot Hash value herein is obtained by the terminal by means of calculation, and includes a 64-bit screenshot feature code. Each bit in the 64-bit screenshot feature code indicates a feature value of a sub-area.

In this embodiment, when the server performs the function of the step, the step may be performed by an advertisement feature search server.

Step 202: Matching the feature information of the pop-up window event with data stored in a first database by determining whether the feature information of the pop-up window event corresponds to the data stored in the first database, recognizing the type of the multimedia information according to a matching result, and sending the type of the multimedia information back to the terminal.

Specifically, the advertisement feature search server searches the first database, matches the feature information of the pop-up window event with the data stored in the first database, recognizes the type of the multimedia information according to the matching result, and sends the type of the multimedia information to the terminal.

When recognizing, according to the matching result, that the type of the multimedia information is the first multimedia information, the server further sends a processing policy corresponding to the first multimedia information back to the terminal.

The first database is an advertisement feature database. Most first multimedia information is advertisements. The processing policy corresponding to the first multimedia information includes: blocking the multimedia information pop-up window event according to a preset policy, for example, prompting that the multimedia information pop-up window event is successfully blocked when reducing a window of the multimedia information pop-up window event at a first location until the window of the multimedia information pop-up window event disappears.

When recognizing, according to the matching result, that the type of the multimedia information is the second multimedia information, the advertisement feature search server sends the feature information of the pop-up window event to a window feature collection server.

The window feature collection server matches the feature information of the pop-up window event with data stored in a third database; when a matching result is mismatching, the feature information of the pop-up window event is sent to a second database; and when the matching result is matching, the feature information of the pop-up window event is sent to the third database.

The second multimedia information is any multimedia information different from the first multimedia information, that is, the second multimedia information relates to information not related to an advertisement. The third database is a non-advertisement database stored in the cloud and that stores certain known types of non-advertisement windows. When the matching result between the feature information of the pop-up window event and the data stored in the third database is mismatching, it indicates that the pop-up window event is neither an advertisement nor a non-advertisement type window that is specifically categorized for storage in the third database, and rather belongs to an unknown multimedia type that has not been expressly categorized as an advertisement or known type of non-advertisement. Therefore, the feature information of the pop-up window event is sent to the second database and the window feature collection server. The second database is an unknown windows database that stores the remaining unknown windows of information that are not specifically categorized to be stored in the first database or the third database.

A feature learning server extracts the unknown window database according to a preset period, and clusters unknown windows according to data in the newest advertisement feature database, that is, classifies windows of the same type into one type. Specifically, the 64-bit screenshot Hash value of the multimedia information pop-up window event is compared with the data in the advertisement feature library database. Each bit in the 64-bit screenshot feature code is compared. If there is a different bit, 1 is added to a count value. Each time a different bit is added subsequently, 1 is added to the count value. Therefore, different quantities of bits are used to indicate the distance between two screenshot feature codes. The farther distance, as indicated by a higher count value, indicates the larger difference between two pictures. When the obtained distance is less than a preset first threshold, and the names of the progresses to which the two pictures belong are the same, the two pictures are recognized to be pictures of the same type or similar pictures. For recognized pictures of the same type, the total quantities of 0 and 1 that correspond to each bit in n pictures are calculated. If the quantity of 0 s of a bit is greater than the quantity of 1 s, a feature value of the bit is assigned to 0; otherwise, the feature value is assigned to 1. In this way, a 64-bit feature code may be obtained by means of calculation, and is used for representing the type of the pictures. When the quantity of clustering of pictures of the same type exceeds a preset second threshold, it is considered that the type of the pictures is an advertisement that frequently appears, that is, the windows are clustered by means of image fuzziness recognition, and data corresponding to the type of the pictures is synchronized to the advertisement feature database; information describing features of the remaining pictures are synchronized to the non-advertisement feature database.

The data synchronized to the advertisement feature database may be further determined as advertisement feature data by operation personnel according to a requirement, to avoid data error reporting. In addition, the preset first threshold and second threshold are adjusted in time.

Figure 5:
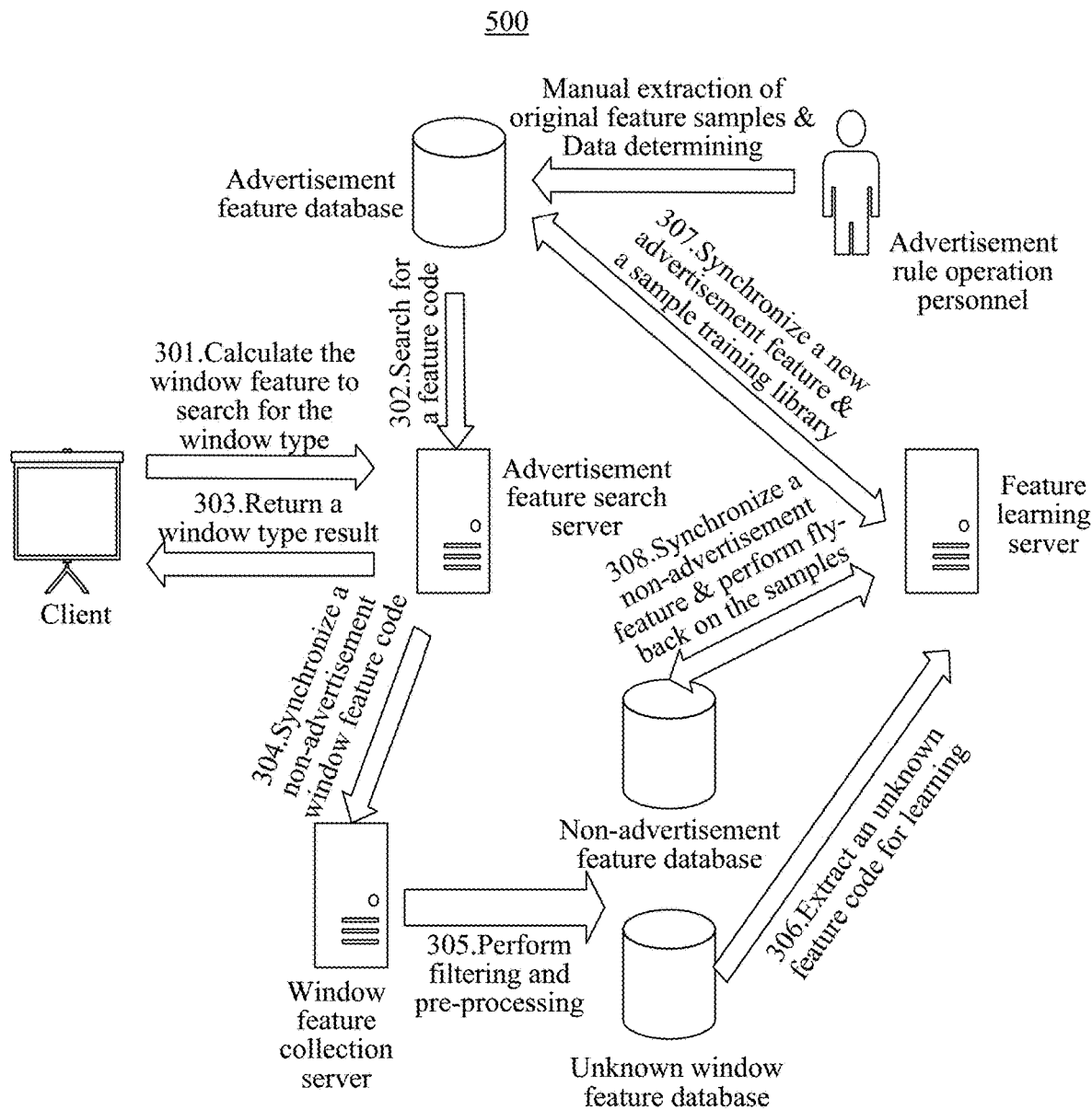
FIG. 5 is a schematic diagram of a detailed processing procedure of the multimedia pop-up window processing method in a specific scenario according to this embodiment.

A schematic diagram of a detailed processing procedure of the multimedia pop-up window processing method according to this embodiment is shown in a flow diagram 500 FIG. 5 and relates to a specific scenario. The following steps are included:

Step 301: A terminal detects a multimedia information pop-up window event, extracts feature information of the multimedia information pop-up window event, and sends, to an advertisement feature search server by means of a C/S protocol, a window type search message carrying the feature information of the multimedia information pop-up window event.

Specifically, the terminal detects, by means of a SetEventHook mechanism of a Windows operation system, the multimedia information pop-up window event occurring at the terminal, and extracts the feature information of the multimedia information pop-up window event before the multimedia information pop-up window is displayed.

The feature information of the multimedia information pop-up window event includes any one of or a combination of multiple of the following information: the window location, the window size, the window title, the progress, a screenshot Hash value, and the like.

The multimedia information pop-up window event includes: a web page advertisement pop-up window and a software advertisement pop-up window. The screenshot Hash value is obtained by calculating a two-dimensional histogram matrix of a screenshot of the multimedia information pop-up window event according to an RGB value of each pixel in the screenshot of the multimedia information pop-up window event; cutting the two-dimensional histogram matrix into 8*8 sub-matrices according to the size of the two-dimensional histogram matrix; performing hash operation on the 8*8 sub-matrices, to generate binary Hash values, the binary Hash values being 0 or 1; and forming a 64-bit long shaped value, that is, a screenshot feature code or a screenshot Hash value by using the binary Hash values. Each bit in the 64-bit screenshot feature code indicates a feature value of a sub-area. The terminal extracts feature codes of already known advertisement window screenshots on the cloud, to form an original advertisement sample library, that is, an advertisement feature database.

Step 302: The advertisement feature search server matches the received feature information of the pop-up window event with data stored in an advertisement feature database by determining whether the feature information of the pop-up window event corresponds to the data stored in the advertisement feature database.

Step 303: The advertisement feature search server sends the type of the window and a corresponding processing policy to the terminal when a matching result determines that the window is an advertisement.

The processing policy corresponding to the advertisement includes: blocking the multimedia information pop-up window event according to a preset policy, for example, prompting that the multimedia information pop-up window event is successfully blocked when reducing a window of the multimedia information pop-up window event at a first location until the window of the multimedia information pop-up window event disappears.

Step 304: The advertisement feature search server synchronizes the feature information of the pop-up window event to a window feature collection server when the matching result determines that the window is a non-advertisement.

Step 305: The window feature collection server filters and pre-processes the received feature information of the pop-up window event.

Specifically, the window feature collection server matches the received feature information of the pop-up window event with a determined non-advertisement feature database; synchronizes the feature information of the pop-up window event to the non-advertisement feature database when a matching result is that the window is a non-advertisement; and synchronizes the feature information of the pop-up window event to an unknown window feature database when the matching result is that the window is an unknown window.

Step 306: A feature learning server extracts an unknown window database according to a preset period, and clusters unknown windows according to the newest advertisement feature database.

Specifically, windows of the same type are classified into one type. Specifically, the 64-bit screenshot Hash value of the multimedia information pop-up window event is compared with the data in the advertisement feature library. Each bit in the 64-bit screenshot feature code is compared. If there is a different bit, 1 is counted. Each time a different bit is added subsequently, 1 is added to the count. Therefore, different quantities of bits are used to indicate the distance between two screenshot feature codes. The farther distance indicates the larger difference between two pictures. When the obtained distance is less than a preset first threshold, and the names of the progresses to which the two pictures belong are the same, the two pictures are recognized to be pictures of the same type or similar pictures. For recognized pictures of the same type, the total quantities of 0 and 1 that correspond to each bit in n pictures are calculated. If the quantity of 0 s of a bit is greater than the quantity of 1 s, a feature value of the bit is assigned to 0; otherwise, the feature value is assigned to 1. In this way, a 64-bit feature code may be obtained by means of calculation, and is used for representing the type of the pictures. When the quantity of clustering of pictures of the same type exceeds a preset second threshold, it is determined that the type of the pictures is an advertisement that frequently appears, and the remaining pictures are non-advertisements.

Step 307: The feature learning server synchronizes, to the advertisement feature database, a new advertisement feature information of an unknown window recognized as an advertisement. The feature learning server also synchronizes a sample training library.

It needs to be noted herein that data synchronized to the advertisement feature database may be further determined as advertisement feature data by operation personnel according to a requirement, to avoid data error reporting. In addition, the preset first threshold and second threshold are adjusted in time.

Step 308: The feature learning server synchronizes, to a non-advertisement feature database, feature information of an unknown window recognized as a non-advertisement.

Figure 6:
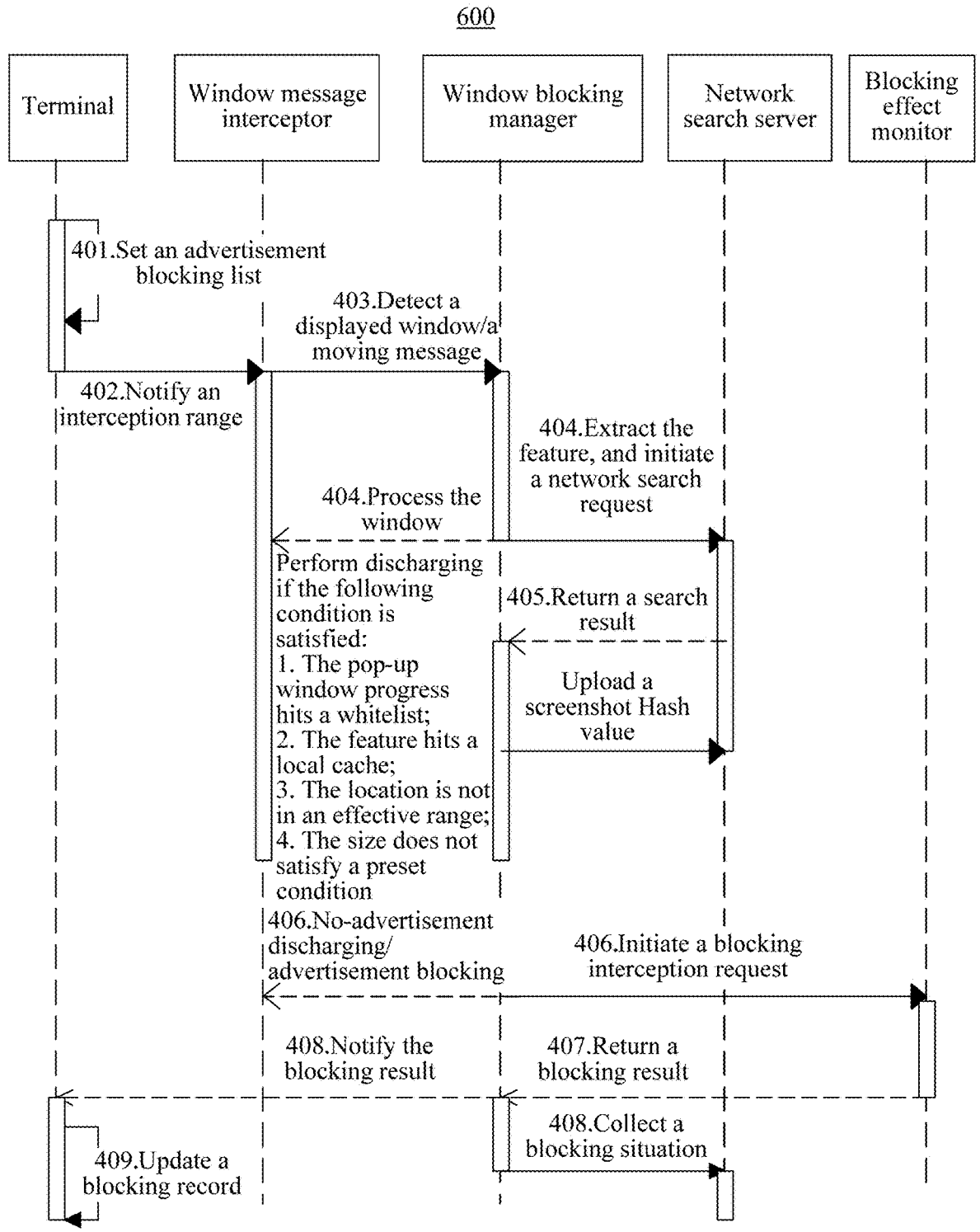
FIG. 6 is a schematic diagram of a specific processing procedure of intercepting/blocking a multimedia information pop-up window event according to Embodiment 3.

An embodiment is a specific processing procedure of intercepting/blocking a multimedia information pop-up window event by a terminal (specifically, an advertisement blocking application installed in the terminal performs the processing procedure). As shown in a flow diagram 600 shown in FIG. 6, the following steps are included:

Step 401: Set an advertisement blocking list on an advertisement blocking home screen of the terminal.

Specifically, for a schematic diagram of setting the advertisement blocking list, refer to the operational features included in the GUI 200 shown in FIG. 2.

Step 402: The terminal notifies a window message interceptor of an interception range.

The interception range herein includes: information such as the location of an intercepted window.

Step 403: The window message interceptor sends a message to a window blocking manager when detecting a displayed window or a moving message.

Step 404: The window blocking manager processes the window.

Specifically, the window blocking manager discharges the window when determining that the pop-up window progress of the window hits a whitelist, the feature hits a local cache, the window location is not in an effective range, and the window size does not satisfy a preset condition; otherwise, extracts feature information of the window, and sends, to a network search server, a network search request including a screenshot Hash value of the window, to request to search the type of the window.

Step 405: A network search server sends a search result to the window blocking manager.

Step 406: The window blocking manager discharges the window when the search result indicates a non-advertisement; the window blocking manager sends a blocking interception request to a blocking effect monitor when the search result indicates an advertisement.

Step 407: The blocking effect monitor returns a blocking result to the window blocking manager.

Step 408: The window blocking manager notifies the terminal of the blocking result, and counts a blocking situation.

Step 409: The terminal updates a blocking record.

Figure 7:
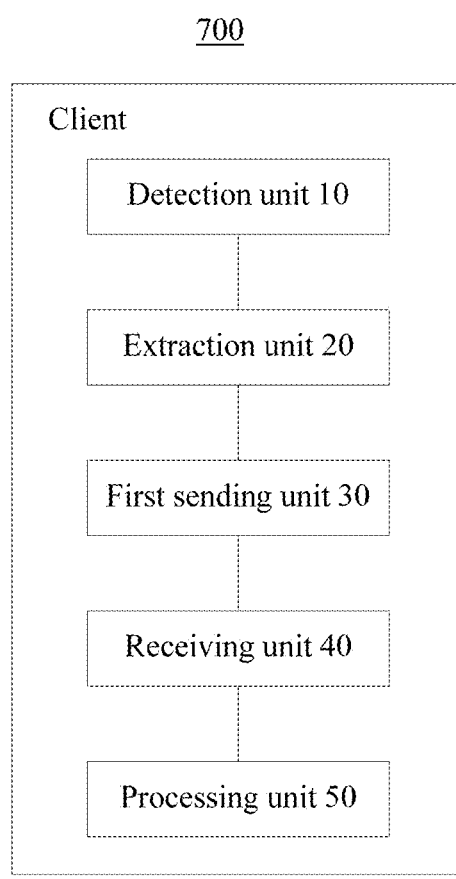
FIG. 7 is a schematic diagram of the composition of a terminal according to Embodiment 4.

An embodiment provides a terminal to implement the foregoing multimedia information pop-up window processing method. The composition of an exemplary client terminal 700 is shown in FIG. 7 and includes: a detection unit 10, an extraction unit 20, a first sending unit 30, a receiving unit 40, and a processing unit 50.

The detection unit 10 is configured to detect a multimedia information pop-up window event.

The extraction unit 20 is configured to: extract feature information of the multimedia information pop-up window event, and encapsulate the feature information of the multimedia information pop-up window event into a first request message.

The first sending unit 30 is configured to send the first request message, to request to obtain the type of the multimedia information.

The receiving unit 40 is configured to receive a first request response message.

The processing unit 50 is configured to: obtain the type of the multimedia information by parsing the first request response message, and process the multimedia information pop-up window according to the type of the multimedia information.

In this embodiment, the processing unit 50 is specifically configured to: block the multimedia information pop-up window event according to a preset processing policy when the type of the multimedia information obtained by parsing the first request response message is first multimedia information; and send the feature information of the pop-up window event when the type of the multimedia information obtained by parsing the first request response message is second multimedia information, to further determine the type of the multimedia information.

In this embodiment, the processing unit 50 is specifically configured to prompt that the multimedia information pop-up window event is successfully blocked when reducing a window of the multimedia information pop-up window event at a first location until the window of the multimedia information pop-up window event disappears.

In this embodiment, the extraction unit 20 is specifically configured to extract at least one of the following information: the window location of the pop-up window event, the window size of the pop-up window event, the title of the pop-up window event, the progress to which the pop-up window event belongs, and a screenshot Hash value of the pop-up window event.

In this embodiment, the detection unit 10 detects, by using a SetEventHook mechanism of a Windows system, the multimedia information pop-up window event occurring at the terminal.

The multimedia information pop-up window event herein includes: a web page advertisement pop-up window and a software advertisement pop-up window.

In this embodiment, the screenshot Hash value is obtained by calculating a two-dimensional histogram matrix of a screenshot of the multimedia information pop-up window event according to an RGB value of each pixel in the screenshot of the multimedia information pop-up window event; cutting the two-dimensional histogram matrix into 8*8 sub-matrices according to the size of the two-dimensional histogram matrix; performing hash operation on the 8*8 sub-matrices, to generate binary Hash values, the binary Hash values being 0 or 1; and forming a 64-bit long shaped value, that is, a screenshot feature code or a screenshot Hash value by using the binary Hash values. Each bit in the 64-bit screenshot feature code indicates a feature value of a sub-area. The terminal extracts feature codes of already known advertisement window screenshots on the cloud, to form an original advertisement sample library, that is, an advertisement feature database.

In this embodiment, the first sending unit 30 sends the first request message to a server by means of a C/S protocol, to request to obtain the type of the multimedia information.

In this embodiment, the processing unit 50 blocks the multimedia information pop-up window event according to the preset processing policy when the type of the multimedia information obtained by parsing the first request response message is the first multimedia information. The blocking the multimedia information pop-up window event includes, but is not limited to, closing the window, ending the progress, or the like.

When the type of the multimedia information obtained by means of parsing is the the first multimedia information, that is, an advertisement, the terminal may actively add operational performance capabilities for blocking of a software advertisement pop-up window, thereby improving the degree of freedom and convenience of a user. Specifically, a schematic diagram of adding ad advertisement blocking item is shown in FIG. 2. Checking the name of a corresponding software advertisement pop-up window indicates blocking the software advertisement pop-up window.

When the type of the multimedia information obtained by parsing the first request response message is the second multimedia information, the processing unit in the terminal sends the feature information of the pop-up window event to the server, to further determine the type of the multimedia information.

The first multimedia information is an advertisement, and the second multimedia information is unknown information, that is, the type of the multimedia information cannot be recognized according to a current recognition policy.

The blocking the multimedia information pop-up window event according to a preset policy herein includes: prompting that the multimedia information pop-up window event is successfully blocked when reducing a window of the multimedia information pop-up window event at a first location until the window of the multimedia information pop-up window event disappears.

In this embodiment, a schematic diagram of blocking the multimedia information pop-up window event for the first time is shown in FIG. 3. The residence time of a pop-up advertisement at the terminal is approximately 1 s to 1.5 s. Computer Manager tips slide out from the lower right corner of the terminal screen after the advertisement resides on for 1.5 s, to reduce to display the pop-up advertisement at the lower right corner of the terminal screen, and hide the pop-up advertisement in a Manager shield. When the pop-up advertisement gradually disappears from the Manager shield, it indicates that the blocking succeeds. The tips feed back a blocking success result and display a check mark symbol indicating the blocking success. In this case, the advertisement blocking ends. Except for the blocking the multimedia information pop-up window event for the first time that needs to notify or prompt a user, the subsequent operation of blocking the multimedia information pop-up window event is performed by default, so as not to disturb the user.

Figure 8:
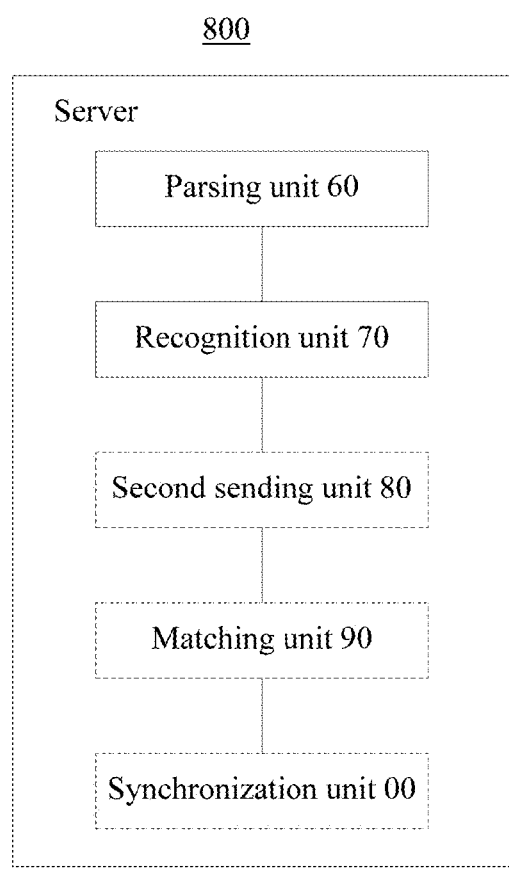
FIG. 8 is a schematic diagram of the composition of a server according to Embodiment 5.

An embodiment provides a server to implement the foregoing multimedia information pop-up window processing method. The composition of an exemplary server 800 is shown in FIG. 8 and includes: a parsing unit 60 and a recognition unit 70.

The parsing unit 60 is configured to: receive a first request message, and obtain feature information of a multimedia information pop-up window event by parsing the first request message.

The recognition unit 70 is configured to: match the feature information of the pop-up window event with data stored in a first database by determining whether the feature information of the pop-up window event corresponds to the data stored in the first database, and recognize and send the type of the multimedia information according to a matching result.

In this embodiment, when the recognition unit 70 recognizes that the type of the multimedia information is first multimedia information, the server further includes: a second sending unit 80, configured to send a processing policy corresponding to the first multimedia information.

In this embodiment, when the recognition unit 70 recognizes that the type of the multimedia information is second multimedia information, the server further includes: a matching unit 90, configured to: match the feature information of the pop-up window event with data stored in a third database, and send the feature information of the pop-up window event to a second database when a matching result is mismatching.

In this embodiment, the server further includes: an synchronization unit 00, configured to: extract data in the second database, match the data in the second database with the data in the first database, synchronize data in the second database that satisfies a preset first condition to the first database, and synchronize data in the second database that satisfies a preset second condition to the third database.

In this embodiment, the parsing unit 60 receives a first request message sent by a terminal, and obtains feature information of a multimedia information pop-up window event by parsing the first request message.

The feature information of the multimedia information pop-up window event includes any one of or a combination of multiple of the following information: the window location, the window size, the window title, the progress, a screenshot Hash value, and the like.

The screenshot Hash value herein is obtained by the terminal by means of calculation, and includes a 64-bit screenshot feature code. Each bit in the 64-bit screenshot feature code indicates a feature value of a sub-area.

The function performed by the parsing unit 60 herein may be implemented by an advertisement feature search server.

In this embodiment, the recognition unit 70 searches a first database, matches the feature information of the pop-up window event with data stored in the first database by determining whether the feature information of the pop-up window event corresponds to the data stored in the first database, recognizes the type of the multimedia information according to a matching result, and sends the type of the multimedia information to the terminal.

When it is recognized, according to the matching result, that the type of the multimedia information is first multimedia information, the second sending unit 80 further sends a processing policy corresponding to the first multimedia information to the terminal.

The first database is an advertisement feature database. Most first multimedia information is advertisements. The processing policy corresponding to the first multimedia information includes: blocking the multimedia information pop-up window event according to a preset policy, for example, prompting that the multimedia information pop-up window event is successfully blocked when reducing a window of the multimedia information pop-up window event at a first location until the window of the multimedia information pop-up window event disappears.

When recognizing, according to the matching result, that the type of the multimedia information is second multimedia information, the recognition unit 70 sends the feature information of the pop-up window event to the matching unit 90.

The matching unit 90 matches the feature information of the pop-up window event with data stored in a third database by determining whether the feature information of the pop-up window event corresponds to the data stored in the third database; when a matching result is mismatching, sends the feature information of the pop-up window event to a second database; and when the matching result is matching, sends the feature information of the pop-up window event to the third database.

The function performed by the matching unit 90 herein may be implemented by the matching unit 90 included as part of a window feature collection server.

The second multimedia information is multimedia information different from the first multimedia information, that is, the second multimedia information relates to a known type of non-advertisement. The third database is a database that is stored in the cloud and that is determined to be a non-advertisement database. When the matching result between the feature information of the pop-up window event and the data stored in the third database is mismatching, this indicates that the pop-up window event is neither an advertisement nor a known type of non-advertisement, and therefore belongs to an unknown multimedia type. Therefore, the feature information of the pop-up window event is sent to the second database and the window feature collection server. The second database is an unknown window database.

In this embodiment, the synchronization unit 00 extracts the unknown window database according to a preset period, and clusters unknown windows according to data in the newest advertisement feature database, that is, classifies windows of the same type into one type. Specifically, the 64-bit screenshot Hash value of the multimedia information pop-up window event is compared with the data in the advertisement feature library. Each bit in the 64-bit screenshot feature code is compared. If there is a different bit, 1 is counted. Each time a different bit is added subsequently, 1 is added to the count. Therefore, different quantities of bits are used to indicate the distance between two screenshot feature codes. The farther distance indicates the larger difference between two pictures. When the obtained distance is less than a preset first threshold, and the names of the progresses to which the two pictures belong are the same, the two pictures are recognized to be pictures of the same type or similar pictures. For recognized pictures of the same type, the total quantities of 0 s and 1 s that correspond to each bit in n pictures are calculated. If the quantity of 0 s of a bit is greater than the quantity of 1 s, a feature value of the bit is assigned to 0; otherwise, the feature value is assigned to 1. In this way, a 64-bit feature code may be obtained by means of calculation, and is used for representing the type of the pictures. When the quantity of clustering of pictures of the same type exceeds a preset second threshold, it is considered that the type of the pictures is an advertisement that frequently appears, and data corresponding to the type of the pictures is synchronized to the advertisement feature database; the remaining pictures are synchronized to the non-advertisement feature database.

In this embodiment, the function performed by the synchronization unit 00 may be implemented by the synchronization unit 00 included as part of a feature learning server.

It needs to be noted herein that the data synchronized to the advertisement feature database may be further determined as advertisement feature data by operation personnel according to a requirement, to avoid data error reporting. In addition, the preset first threshold and second threshold are adjusted in time.

Figure 9:
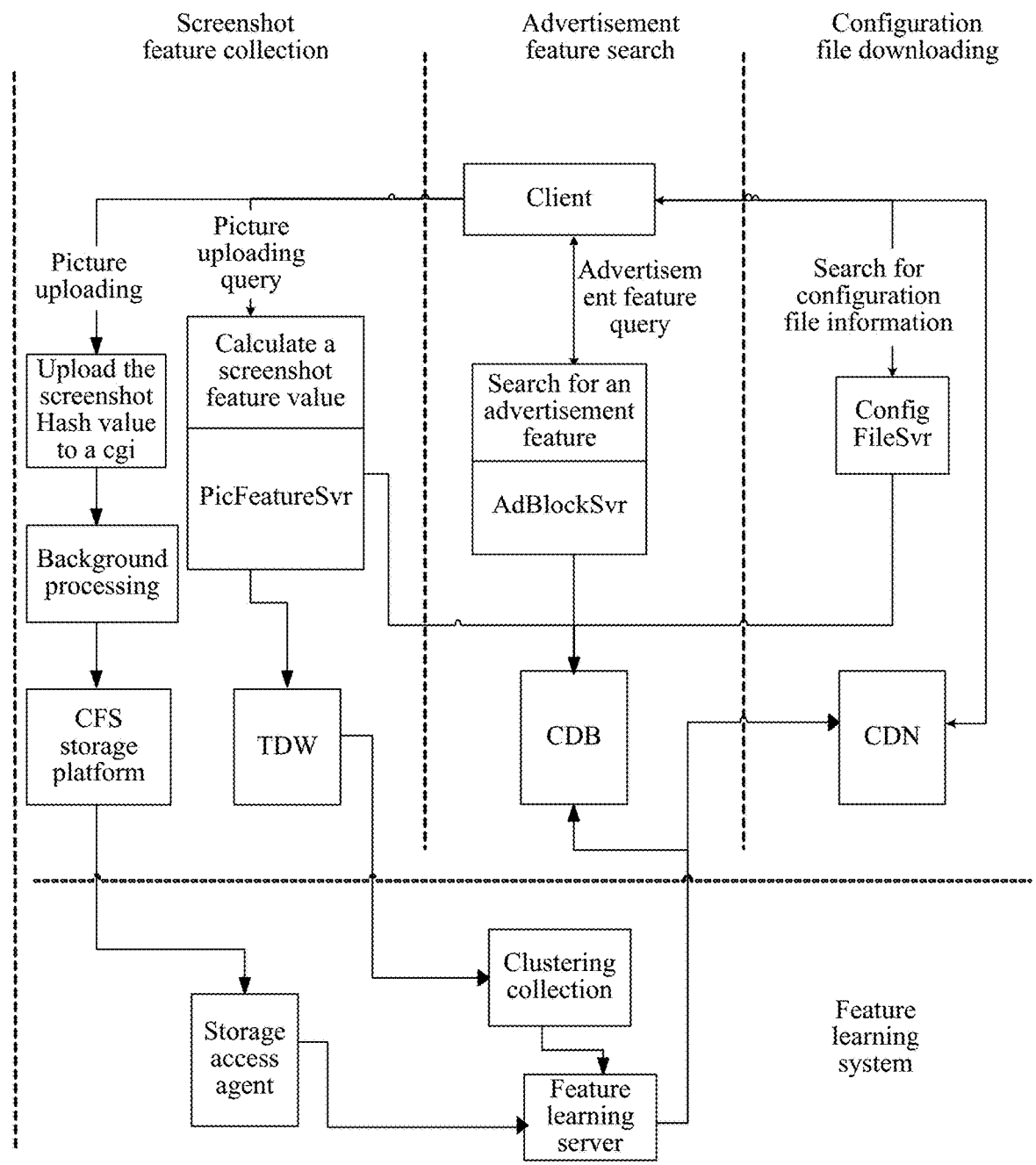
FIG. 9 is a schematic diagram of components of a cloud server and a relationship of executed functions according to this embodiment.

In this embodiment, a diagram of components of a cloud server and a relationship of executed functions is shown in FIG. 9. The terminal periodically or regularly searches for configuration file information, updates a configuration file of the terminal according to the found configuration file information, performs operations such as calculating a screenshot feature value and uploading a picture according to the updated configuration file information, and receives a advertisement feature search result returned by the advertisement feature search server. The advertisement blocking server (AdBlockSvr) searches the advertisement feature library database (CDB) according to an advertisement feature search request sent by the terminal, and feeds back the search result and a blocking policy to the terminal. The window feature collection server processes the window feature. The feature learning server performs clustering and counting on the window, and synchronizes the window feature to the advertisement feature library or a non-advertisement feature library. The Tencent distributed data warehouse (TDW) and the CDB are databases, and the content delivery network (CDN) is a file downloading center.

Figure 10:
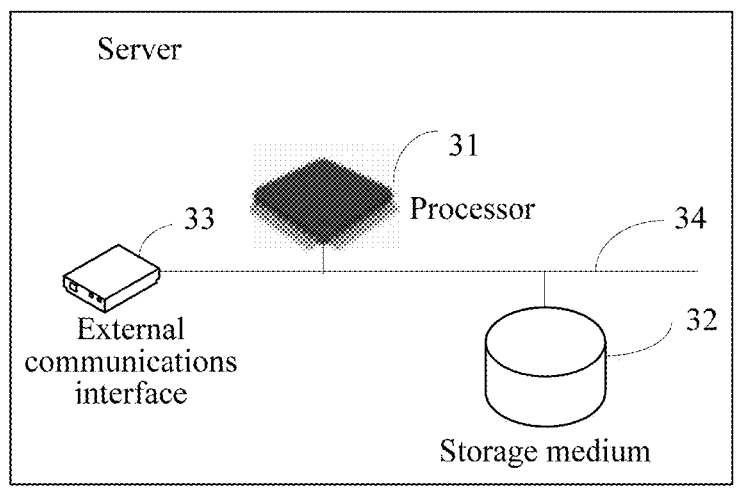
FIG. 10 is a schematic diagram of the composition of the server as a hardware entity according to this embodiment.

In an example in which the server serves as a hardware entity, as shown in FIG. 10, the server includes a processor 31, a storage medium 32, and at least one external communications interface 33. The processor 31, the storage medium 32, and the external communications interface 33 are all connected by means of a bus 34.

It needs to be additionally noted herein is that the server includes at least a database used for storing data and a processor configured to process the data, or includes a storage medium disposed in the server or an independently disposed storage medium.

For the processor configured to process the data, during processing, a microprocessor, a central processing unit (CPU), a digital signal processor (DSP), or a field programmable gate array (FPGA) may be used for implementation. The storage medium includes an operation instruction. The operation instruction may be computer executable code. The steps in the procedure of the information processing method in the foregoing embodiments are implemented by means of the operation instruction.

Figure 11:
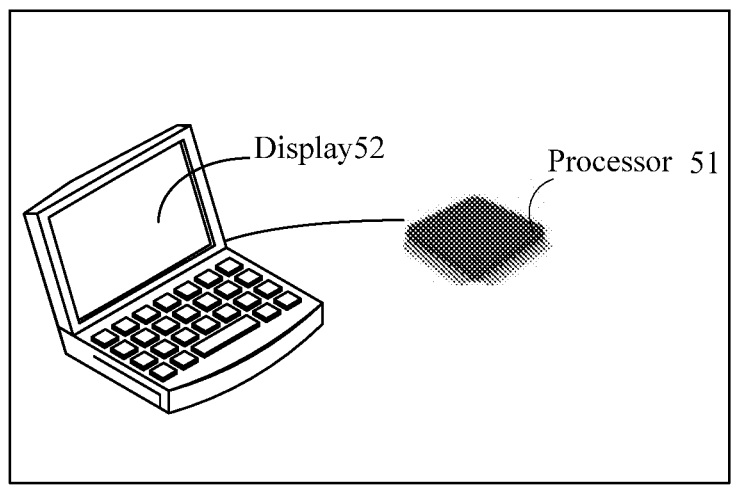
FIG. 11 is a schematic diagram of a terminal as a hardware entity according to Embodiment 6.
Figure 12:
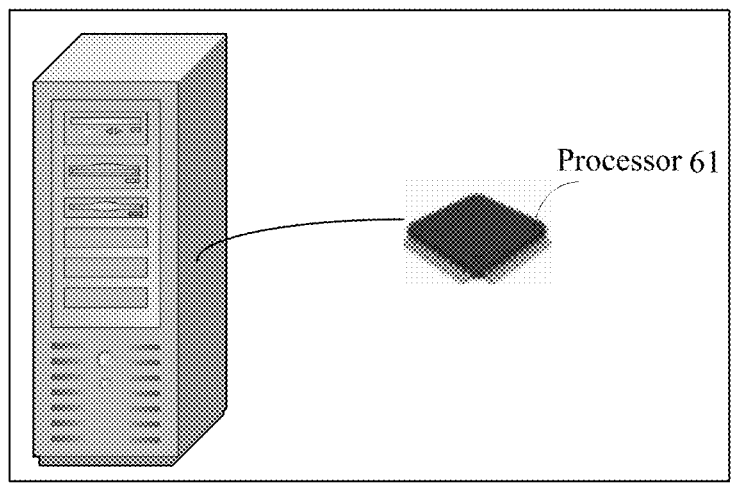
FIG. 12 is a schematic diagram of a server as a hardware entity according to Embodiment 7.

An embodiment further provides a terminal. As shown in FIG. 11, the terminal includes: a processor 51 and a display 52. The display 52 is configured to display information on a user interface. The processor 51 is configured to perform the following operations by means of executable instructions: detecting a multimedia information pop-up window event; extracting feature information of the multimedia information pop-up window event, and encapsulating the feature information of the multimedia information pop-up window event into a first request message; sending the first request message, to obtain the type of the multimedia information; receiving a first request response message; and obtaining the type of the multimedia information by parsing the first request response message, and processing the multimedia information pop-up window according to the type of the multimedia information.

The terminal in FIG. 11 being a notebook computer is merely an example. During actual application, the terminal may be a type of a mobile phone, a tablet computer, a desktop computer, an all-in-one machine, or the like.

An embodiment further provides a server. The server includes a processor 61, configured to perform the following operations by means of executable instructions: receiving a first request message, and obtaining feature information of a multimedia information pop-up window event by parsing the first request message; and matching the feature information of the pop-up window event with data stored in a first database, and recognizing and sending the type of the multimedia information according to a matching result.

Correspondingly, an embodiment provides a computer storage medium. The computer storage medium stores a computer program. The computer program is used for performing the foregoing multimedia pop-up window processing method.

It needs to be noted herein that the foregoing description related to the server is similar to the description of the foregoing method. The description of beneficial effects of the same methods is not described again. For the technical details of the server that are not revealed in the present disclosure, refer to the description of the foregoing embodiments.

In the several embodiments, it should be understood that the provided device and method may be implemented in other manners. The device embodiments described above are merely exemplary. For example, the division of the units is merely the division of logic functions, and may use other division manners during actual implementation. For example, multiple units or components may be combined, or may be integrated into another system, or some features may be omitted or not performed. In addition, the coupling, or direct coupling, or communication connection between the displayed or discussed components may be the indirect coupling or communication connection by means of some interfaces, devices, or units, and may be electrical, mechanical, or of other forms.

The units described as separated components may be, or may not be, physically separated. The components displayed as units may be, or may not be, physical units, and may be located in one place, or may be distributed to multiple network units. Some or all of the units may be selected according to actual requirements to achieve the objective of the solution of the embodiments.

In addition, the functional units in the embodiments may be all integrated into a processing unit, or each of the units may independently serve as a unit, or two or more units may be integrated into one unit. The integrated unit may be implemented in the form of hardware, or may be implemented in the form of adding hardware and a software functional unit.

A person of ordinary skill in the art may understand that all or some of the steps of the foregoing embodiments may be implemented by a program instructing relevant hardware. The program may be stored in a computer readable storage medium. During performing, the program performs the steps of the foregoing embodiments. The foregoing storage medium includes: a medium such as a mobile storage device, a read-only memory (ROM), a random access memory (RAM), a disc, or a compact disc that can store program code.

Alternatively, when the integrated unit in the present disclosure is implemented in the form of a software function module and sold or used as an independent product, the integrated unit may be stored in a computer readable medium. Based on such an understanding, the technical solutions of the embodiments essentially, or the part contributing to the existing technology may be implemented in the form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: a medium such as a mobile storage device, a ROM, a RAM, a disc, or a compact disc that can store program code.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

By means of the multimedia information pop-up window processing method provided in the embodiments, on the terminal side, a multimedia information pop-up window event is detected in any area in real time; feature information of the multimedia information pop-up window event that includes a screenshot Hash value is extracted; the feature information of the multimedia information pop-up window event is encapsulated into a first request message; the first request message is sent, to request to obtain the type of the multimedia information; a first request response message is received, the type of the multimedia information is obtained by parsing the first request response message, and the multimedia information pop-up window is processed according to the type of the multimedia information. On the server side, the type of multimedia information is recognized to be an advertisement, a non-advertisement, or unknown according to feature information of a multimedia information pop-up window event, an existing advertisement feature database, and a non-advertisement feature database; when the type the multimedia information is recognized to be unknown, a window of the unknown multimedia information is clustered by using an image fuzziness recognition algorithm, and the clustered window is further recognized to be an advertisement or a non-advertisement. In this way, not only a preset advertisement window is blocked, but also an unknown window or a deformed window is blocked.

What is claimed is:

1. A multimedia information pop-up window processing method implemented on a terminal, the method comprising:
    detecting a multimedia information pop-up window event;
    extracting feature information of the multimedia information pop-up window event;
    including the feature information of the multimedia information pop-up window event into a first request message;
    sending the first request message to a server;
    receiving a first request response message from the server;
    parsing the first request response message;
    obtaining a type of the multimedia information based on the parsing;
    processing the multimedia information pop-up window according to the type of the multimedia information;
    determining whether a predetermined length of time has passed;
    when the predetermined length of time is determined to have passed, displaying a management graphical user interface (GUI) on a portion of a displayed screen including the multimedia information pop-up window event;

determining whether the multimedia information pop-up window event has ceased; and including a removal message in the management GUI when the multimedia information pop-up window event is determined to have ceased.

2. The method according to claim 1, wherein processing the multimedia information pop-up window according to the type of the multimedia information comprises:

blocking the multimedia information pop-up window event according to a preset processing policy when the type of the multimedia information is a first multimedia information; and sending the feature information to the server when the type of the multimedia information is a second multimedia information.

3. The method according to claim 2, wherein blocking the multimedia information pop-up window event according to the preset processing policy comprises:

presenting a prompt display describing the multimedia information pop-up window event is successfully blocked when reducing a window of the multimedia information pop-up window event at a first location until the window of the multimedia information pop-up window event disappears.

4. The method according to claim 1, wherein extracting the feature information of the pop-up window event comprises:

extracting at least one of the following information: a window location of the pop-up window event, a window size of the pop-up window event, a title of the pop-up window event, a progress to which the pop-up window event belongs, and a screenshot Hash value of the pop-up window event.

5. A terminal, comprising:

a display, the display configured to display information on a user interface; and a processor configured to:
detect a multimedia information pop-up window event;
extract feature information of the multimedia information pop-up window event;
include the feature information of the multimedia information pop-up window event into a first request message;
send the first request message to a server;
receive a first request response message from the server; and
parse the first request response message;
obtain a type of the multimedia information;
process the multimedia information pop-up window according to the type of the multimedia information;
determine whether a predetermined length of time has passed;
when the predetermined length of time is determined to have passed, display a management graphical user interface (GUI) on a portion of a displayed screen including the multimedia information pop-up window event;
determine whether the multimedia information pop-up window event has ceased; and
include a removal message in the management GUI when the multimedia information pop-up window event is determined to have ceased.

6. The terminal according to claim 5, wherein the processor is further configured to:

block the multimedia information pop-up window event according to a preset processing policy when the type of the multimedia information is a first multimedia information; and send the feature information of the pop-up window event to the server when the type of the multimedia information is a second multimedia information.

7. The terminal according to claim 6, wherein the processor is further configured to:

present a prompt display describing the multimedia information pop-up window event is successfully blocked when reducing a window of the multimedia information pop-up window event at a first location until the window of the multimedia information pop-up window event disappears.

8. The terminal according to claim 5, wherein the processor is further configured to:

extract at least one of the following information: a window location of the pop-up window event, a window size of the pop-up window event, a title of the pop-up window event, a progress to which the pop-up window event belongs, and a screenshot Hash value of the pop-up window event.

9. A multimedia information pop-up window processing method implemented on a server, the method comprising:

receiving a first request message from a terminal;
obtaining feature information of a multimedia information pop-up window event by parsing the first request message;
matching the feature information with data stored in a first database;
recognizing a type of the multimedia information according to the matching;
sending the type of the multimedia information to the terminal;
wherein when the type of the multimedia information is a second multimedia information, the method further comprises:
matching the feature information with data stored in a third database; and
sending the feature information to a second database when matching the feature information with data stored in the third database results in a mismatching;
extracting data in the second database;
matching the data in the second database with the data in the first database;
synchronizing data in the second database that satisfies a preset first condition to the first database; and
synchronizing data in the second database that satisfies a preset second condition to the third database.

10. The method according to claim 9, wherein when the type of the multimedia information is a first multimedia information, the method further comprises:

sending, to the terminal, a processing policy corresponding to the first multimedia information.

11. A server, the server comprising:

a processor configured to:
receive a first request message from a terminal;
obtain feature information of a multimedia information pop-up window event by parsing the first request message;
match the feature information of the multimedia information pop-up window event with data stored in a first database;
recognize a type of the multimedia information according to matching the feature information of the multimedia information pop-up window event with data stored in the first database;
send the type of the multimedia information to the terminal;
match the feature information of the pop-up window event with data stored in a third database;
send the feature information of the pop-up window event to a second database when a the matching results in a mismatching;
extract data in the second database;
match the data in the second database with the data in the first database;
synchronize data in the second database that satisfies a preset first condition to the first database; and
synchronize data in the second database that satisfies a preset second condition to the third database.

12. The server according to claim 11, wherein the processor is further configured to:
send, when recognizing that the type of the multimedia information is a first multimedia information, a processing policy corresponding to the first multimedia information to the terminal.

13. The server according to claim 11, wherein the processor is further configured to:
obtain feature information of an unknown window from an unknown windows database, the feature information of the unknown window including a second hash value, and wherein the feature information of the multimedia information pop-up window includes a first hash value;
compare the first hash value to the second hash value;
determine a number of different bits between the first hash value and the second hash value based on comparing the first hash value to the second hash value;
set a count value to the number of different bits between the first hash value and the second hash value based on the comparison;
determine the unknown window and the multimedia information pop-up window are of a same type when the count value is less than a threshold value; and
determine the unknown window and the multimedia information pop-up window are not of a same type when the count value is greater than the threshold value.

14. A computer storage medium, the computer storage medium storing processor executable instructions that when executed by the processor, cause the processor to perform a method comprising:

detecting a multimedia information pop-up window event;
extracting feature information of the multimedia information pop-up window event;
including the feature information of the multimedia information pop-up window event into a first request message;
sending the first request message to a server;
receiving a first request response message from the server;
parsing the first request response message;
obtaining the type of the multimedia information based on the parsing;
processing the multimedia information pop-up window according to the type of the multimedia information;
determining whether a predetermined length of time has passed;
when the predetermined length of time is determined to have passed, displaying a management graphical user interface (GUI) on a portion of a displayed screen including the multimedia information pop-up window event;
determining whether the multimedia information pop-up window event has ceased; and
including a removal message in the management GUI when the multimedia information pop-up window event is determined to have ceased.

15. The computer storage medium according to claim 14, wherein the feature information of the multimedia information pop-up window event includes a screenshot hash value, the screenshot hash value obtained by:
calculating a two-dimensional histogram matrix of a screenshot of the multimedia information pop-up window event according to a red-green-blue (RGB) value of each pixel in the screenshot of the multimedia information pop-up window event;
partitioning the two-dimensional histogram matrix into 8 by 8 sub-matrices;
generating binary hash values by performing a hash operation on the 8 by 8 sub-matrices, the binary Hash values being 0 or 1; and
generating at least one of a screenshot feature code or a screenshot hash value using the binary Hash values.

* * * * *